US00RE36853E

United States Patent [19]

Kennedy et al.

[11] E Patent Number: Re. 36,853

[45] Reissued Date of Patent: Sep. 5, 2000

[54] MINE DOOR SYSTEM

[75] Inventors: William R. Kennedy; John M. Kennedy, both of Taylorville, Ill.

[73] Assignee: Jack Kennedy Metal Products and Buildings, Inc., Taylorville, Ill.

[21] Appl. No.: 08/999,304

[22] Filed: Dec. 29, 1997

Related U.S. Patent Documents

Reissue of:

[64] Patent No.: Re. 34,053
Issued: Sep. 1, 1992
Appl. No.: 07/599,344
Filed: Oct. 17, 1990

Which Is a Reissue of:

[64] Patent No.: 4,911,577
Issued: Mar. 27, 1990
Appl. No.: 08/361,400
Filed: Jun. 5, 1989

[51] Int. Cl.[7] ..... E21D 9/14; D21F 1/00

[52] U.S. Cl. ..... 405/132; 49/501; 49/505; 52/630; 405/150.1; 405/151

[58] Field of Search ..... 49/381, 397, 501, 49/504, 505; 160/199; 405/132, 150.1, 151; 52/782.11, 801.11, 801.12, 204.2, 210, 217, 798.1, 783.12, 792.1, 799.1, 800.1, 800.12, 800.15, 784.12, 784.13, 796.12, 797.1, 455, 630

[56] References Cited

U.S. PATENT DOCUMENTS

| | | | |
|---|---|---|---|
| 1,044,047 | 11/1912 | Hess | 52/630 |
| 1,315,537 | 9/1919 | Barrows | 49/501 |
| 1,689,472 | 10/1928 | Barrows | 49/501 |
| 1,791,679 | 2/1931 | Michelman | 52/630 |
| 2,272,078 | 2/1942 | Zalkind | 52/630 |
| 2,451,396 | 10/1948 | Macleod | 52/630 X |
| 2,834,071 | 5/1958 | Camerino | 52/217 |
| 3,287,854 | 11/1966 | Dasovic et al. | 49/501 |
| 3,461,629 | 8/1969 | Smith . | |
| 3,678,627 | 7/1972 | Dixon | 49/368 X |
| 3,860,288 | 1/1975 | Martin et al. . | |
| 3,979,872 | 9/1976 | Gilchrist et al. | 52/823 X |
| 4,064,924 | 12/1977 | Catlett | 49/368 X |
| 4,084,347 | 4/1978 | Brown | 49/368 X |
| 4,096,702 | 6/1978 | Burton . | |
| 4,467,562 | 8/1984 | Hemmerling | 52/586 X |
| 4,478,535 | 10/1984 | Kennedy et al. | 405/132 |
| 4,484,837 | 11/1984 | Kennedy et al. | 405/150 |
| 4,494,354 | 1/1985 | Johnston | 52/823 X |
| 4,517,767 | 5/1985 | Dewson | 49/464 |
| 4,571,449 | 2/1986 | Lindenberger et al. . | |
| 4,611,452 | 9/1986 | Ralph | 52/455 |
| 4,699,428 | 10/1987 | Vick . | |
| 4,911,577 | 3/1990 | Kennedy et al. | 405/132 |

FOREIGN PATENT DOCUMENTS 2520632 11/1976 Germany .

OTHER PUBLICATIONS

Advertisement for Canton Mine Doors, published prior to Jun. 5, 1988.

Simplex Mine Tmber Jacks, published prior to Jun. 5, 1988.

Drawing of Lee–Norse Company Cab Door, Model No. HH265–3EE60.

*Primary Examiner*—Dennis L. Taylor

*Attorney, Agent, or Firm*—Senniger, Powers, Leavitt & Roedel

[57] ABSTRACT

A mine door system adapted for installation and a passageway in a mine, comprising a door frame adapted to be installed in the passageway and defining a doorway spaced below a ceiling of the passageway and mine door hingedly mounted on the door frame for movement between open and closed positions. The system further comprises a top panel structure for substantially closing the space between the door frame and the ceiling of the passageway, the top panel structure being readily contractible heightwise of the passageway without loss of its structural integrity to accommodate a convergence of the ceiling and floor of the passageway without any substantial heightwise deformation of the door frame.

38 Claims, 2 Drawing Sheets

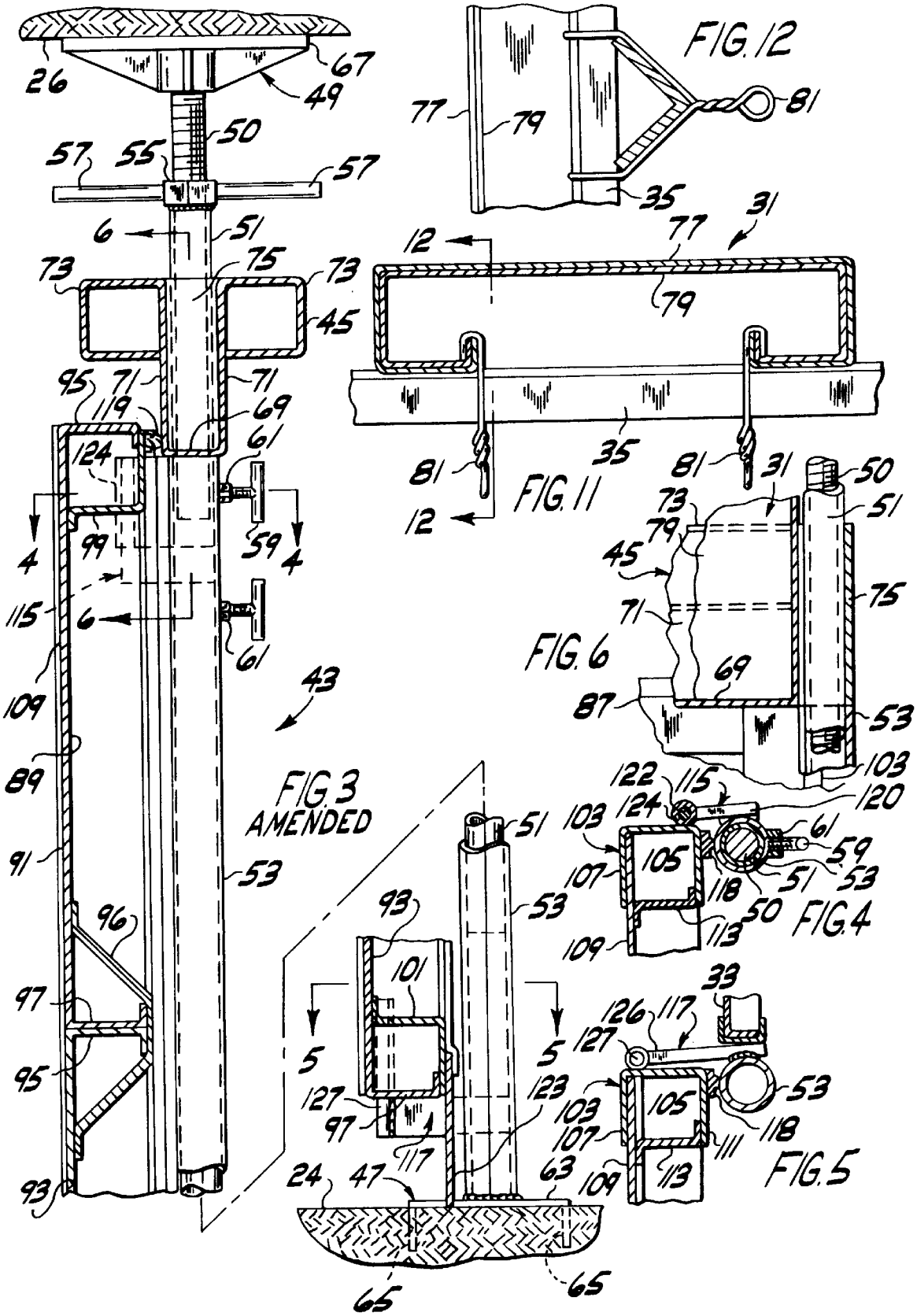
FIG. 12
FIG. 11
FIG. 6
FIG. 3
AMENDED
FIG. 4
FIG. 5

MINE DOOR SYSTEM

Matter enclosed in heavy brackets [ ] appears in the original patent but forms no part of the first and this reissue specification; matter printed in italics indicates the additions made by the first reissue. Matter enclosed in double heavy backets [[ ]] appears in the first reissue patent but forms no part of this reissue specifications; matter printed in bold face indicates the additions made by this reissue.

BACKGROUND OF THE INVENTION

This invention relates to mine doors, and more particularly to a mine door system for installation in a passageway in a mine.

Mine doors are widely used to block air flow yet allow access through passageways in mines, and to further act as fire barriers. A problem encountered with prior art mine doors is the loss of structural integrity of the doors and corresponding door frames, and the impairment of operation of the doors, which may occur when there is a shifting and heaving of the mine in the vicinity of the passageway. The prior art door frames deform under a compressive load, impinging on the structural integrity of the door frames and interfering with normal door movement.

SUMMARY OF THE INVENTION

Among the several objects of this invention may be noted the provision of an improved mine door system which retains its structural integrity upon vertical convergence of the ceiling and floor of a mine passageway; the provision of such a mine door system which accommodates a convergence of the ceiling and floor without any substantial heightwise deformation of the door frame; the provision of such a mine door system having a top panel structure between the door frame and the ceiling of the passageway which is contractible heightwise; the provision of such a mine door system which is lightweight yet sturdy and resistant to flexure; and the provision of such a mine door system in which the door is biased toward its closed position until opened a predetermined amount at which point the door is biased to swing further open.

In general, the mine door system of this invention is adapted for installation in a passageway in a mine and comprises a door frame adapted to be installed in the passageway to define a doorway spaced below the ceiling of the passageway. The mine door system further comprises mine door means and means for mounting the mine door means on the door frame for movement between open and closed positions. A top panel structure substantially closes the space between the door frame and the ceiling of the passageway. This top panel structure is readily contractible heightwise of the passageway without loss of its structural integrity to accommodate a convergence of the ceiling and floor of the passageway without any substantial heightwise deformation of the door frame.

In at least some embodiments the mine door means has a substantially continuous rectangular reinforcing structure of box-like cross-section around its perimeter so that it is lightweight yet sturdy and resistant to flexure. Also, in at least some embodiments the mine door system has offset hinges so that the mine door means is biased toward its closed position until opened a predetermined amount at which point it is then biased to swing further open.

Other objects and features will be in part apparent and in part pointed out hereinafter.

BRIEF DESCRIPTION OF THE DRAWINGS

FIG. 3, is an enlarged vertical section on line 3—3 of FIG. 1 showing a mine door suspended from a column;

FIG. 4 is a horizontal section on line 4—4 of FIG. 3 showing an upper hinge of the mine door;

FIG. 5 is a horizontal section on line 5—5 of FIG. 3 showing an lower hinge of the mine door;

FIG. 6 is an enlarged partial elevation of one end of the lintel;

FIG. 11 is an enlarged section on line 11—11 of FIG. 2 showing one of the extensible and contractible panels; and FIG. 12 is a section taken along line 12—12 of FIG. 11 showing one of the U-shaped wire ties securing the panels to the crossbar.

Corresponding reference characters indicate corresponding parts throughout the several views of the drawings.

DESCRIPTION OF THE PREFERRED EMBODIMENT

Figure 1:
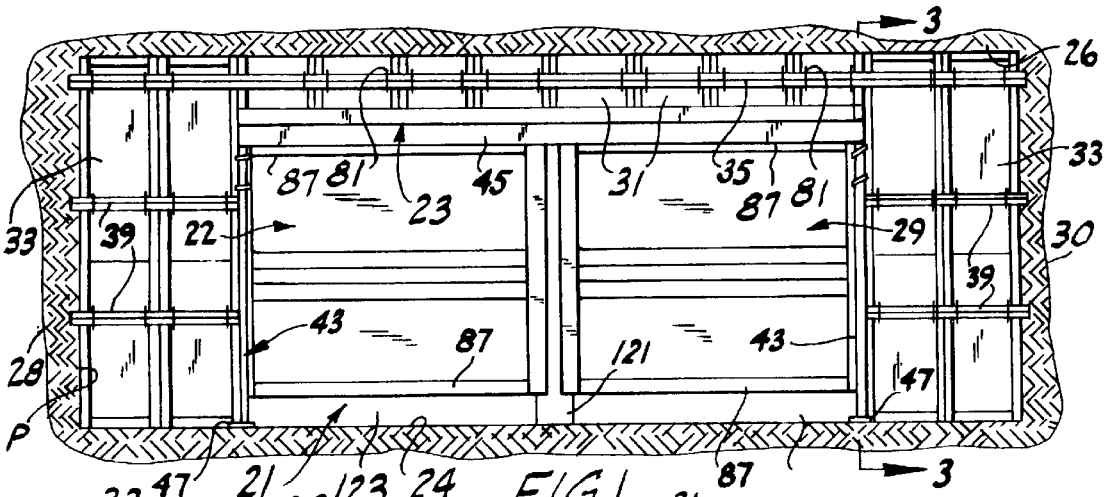
FIG. 1 is a rear elevation of a mine door system constructed according to the principles of this invention installed in a passageway in a mine.
Figure 2:
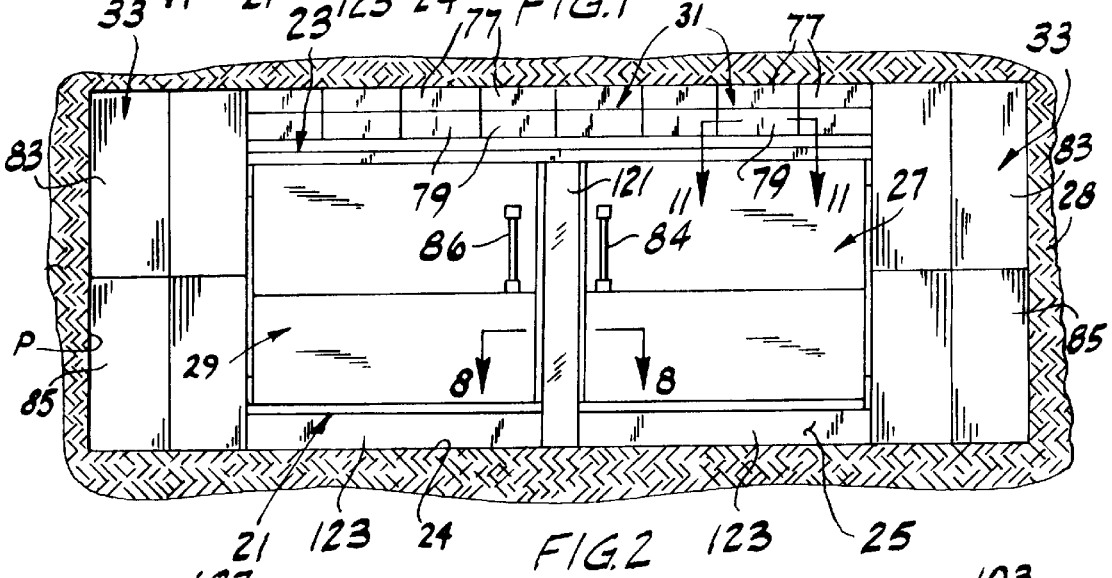
FIG. 2 is a front elevation of the mine door system on FIG. 1.

Referring to FIGS. 1 and 2, there is generally indicated at 21 a mine door system of this invention installed in a mine passageway P having a floor 24, ceiling 26 and left and right ribs 28, 30. The mine door system 21 comprises a door frame, generally designated 23, which defines a doorway 25, and two mine doors 27 and 29, constituting mine door means, mounted on the door frame 23 for movement between open and closed positions. The system further comprises a top panel structure including a plurality of extensible and contractible panels 31 adapted to extend vertically in side-by-side relation from the top of the doorway 25 to the ceiling 26. The system further comprises side panel structures on opposite sides of the doorway including a plurality of elongate extensible and contractible panels 33 adapted to extend vertically in side-by-side relation from the floor 24 to the ceiling 26. The upper portions of extensible panels 31 and 33 are secured to an upper cross bar 35 extending generally horizontally between the ribs 28 and 30. A plurality of vertically spaced lower cross bars 39 extend generally horizontally between the sides of the door frame 23 and the ribs 28 and 30. The elongate extensible panels 33 are also secured to the lower cross bars 39.

Referring to FIGS. 1 to 3, the door frame 23 comprises a pair of *supports in the form of* vertical metal columns each generally designated 43 at opposite sides of the doorway 25 and a lintel member 45 spanning the columns 43 above the doorway 25. Each column 43 (as shown in FIG. 3) has a foot (lower) end 47 engageable with the floor of the passageway P and a head (upper) end 49 engageable with the ceiling. Each column 43 includes a threaded upper tubular section 50, an intermediate tubular section 51, and a lower tubular section 53, all in coaxial relationship and having telescoping sliding interfits to enable adjustment of the length of the column 43 to fit passageways of varying heights. A collar 55 is threaded on the upper section 50 and abuts the upper end of intermediate section 51 to restrict retraction of the upper section 50 into the intermediate section 51. The tubular section 50 is telescoped up and down with respect to the intermediate section 51 by turning the collar 55 with respect to the rod section 50. The collar 55 is provided with handles 57 to facilitate its turning.

Friction lock means, such as a pair of T-shaped threaded fasteners 59, are threaded through lower section 53 to engage intermediate tubular section 51. An internally threaded fastener 61 (e.g., a nut) may be secured to the lower section 53, as by welding, over an opening in the lower tubular section 53 to permit each T-shaped fastener 59 to frictionally engage and lock the intermediate tubular section 51 relative to the lower section. The friction between the fastener 59 and the intermediate tubular section 51 resists relative telescoping of the tubular sections 51 and 53. However, convergence of the floor and ceiling of the passageway P overcomes the frictional force between the tubular sections 51 and 53, causing the sections to telescope relative to each other. Such telescoping does not inelastically deform the tubular sections 51, 53, and does not alter their structural integrity.

Preferably, the foot end 47 of column 43 has a generally horizontal base plate 63 with downwardly projecting claws 65. The claws 65 embed into the floor 24 to prevent lateral movement of the column 43. Additionally, the head end 49 preferably includes a generally horizontal plate 67 which abuts the ceiling of the passageway and is coupled to the upper rod section 50 by a ball and socket type joint for enabling the plate 65 to pivot or swivel to securely engage the ceiling.

Figure 7:
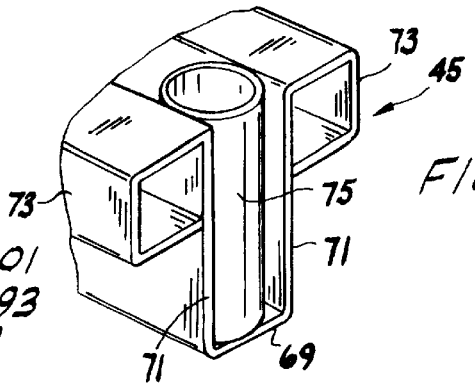
FIG. 7 is a partial perspective of one end of the lintel.

The lintel member 45 (preferably fabricated from sheet metal) spans the columns 43 and abuts the upper ends of the lower tubular sections 53. The lintel member 45 is generally channel-shaped in cross section, comprising a generally horizontal web 69 and vertical flanges 71 extending upwardly at opposite sides of the web 69. The web 69 and flanges 71 form a channel extending substantially the full length of the lintel member 45 for receiving the lower ends of the extensible and contractible panels 31. Horizontal box beams 73 extend along the outside of the flanges 71 adjacent their upper ends to increase the ridigity of the lintel member 45. Vertical guide sleeves 75 are disposed at each end of the lintel member 45 (as shown in FIG. 7) and are secured to the web 69 and in alingment with an aperture in the web 69 by welding or the like. Preferably, the bottom of the lintel member rests on the upper ends of the lower sections 53 of the columns 43 with the intermediate sections 51 extending up through the sleeves 75, thereby securing and supporting the lintel member 45 on the columns 43. The lintel member 45 is thus secured to the lower tubular sections 53 without welding or other fastening means and, therefore, the door frame 23 need not be pre-assembled prior to installation in the passageway.

As previously noted, the top panel structure comprises a plurality of extensible and contractible panels 31 for closing the space between the top of the door frame 23 and the ceiling 26 of the passagewy P. As shown in FIGS. 11 and 12, each panel 31 comprises telescoping upper and lower panel members 77 and 79 constructed as described in our U.S. Pat. No. 4,483,642 which is incorporated herein by reference. The interfit between the panel members is a close sliding frictional interfit and constitutes means for securing the upper and lower panel members in fixed relation while permitting relative telescopic movement therebetween without loss of structural integrity of the panels 31 in the event of convergence of the ceiling and floor of the passageway. The lower panel members 79 are received within the channel defined by the web 69 and flanges 71 of the lintel members. The panels 31 are secured to the upper crossbar 35 by a plurality of generally U-shaped wire ties 81. The panels 31 and their connection to the upper crossbar 35 may be as described in U.S. Pat. No. 4,483,642, incorporated herein by reference.

The lower crossbars 39 extend between the lower tubular sections 53 of the columns 43 and respective ribs 28, 30 to support the elongate extensible side panels 33. The side panels 33 are similar in construction to the panels 31 and are described in greater detail in U.S. Pat. No. 4,483,642. Each panel 33 comprises upper and lower panel members 83, 85 which telescope by a sliding interfit. The interfit is a close frictional interfit and constitutes means for securing the upper and lower panel members in fixed relation while permitting relative telescopic movement therebetween in the event of vertical convergence of the passageway. The panels 33 are secured to the lower cross bars 39 by U-shaped wire ties 81.

The mine doors 27 and 29, constituting mine door means for substantially closing the doorway 25, are hingedly mounted on the columns 43 for swinging open and closed on the same side of the door frame 23. Handles 84 and 86 are provided on the doors 27 and 29, respectively to facilitate the opening and closing of the doors 27 or 29. Each mine door is generally rectangular in shape, *has opposing relatively wide faces (89, 109) generally parallel to the plane of the doorway 25 when the door is closed,* and is preferably fabricated of sheet metal. Each door has a substantially continuous rectangular reinforcing structure 87 around the perimeter of the door on a first (rear) face 89 of the door, the reinforcing structure having a box-like or square cross-section *with a hollow interior. As shown in the drawings, the reinforcing structure 87 projects laterally from the rear face 89 of the door so that the hollow interior of the structure is at the rearward side of the door.*

Figure 8:
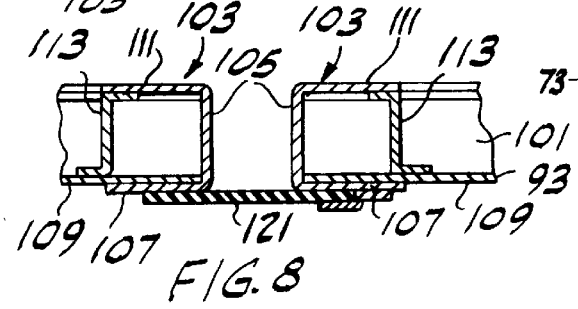
FIG. 8 is an enlarged horizontal section on line 8—8 of FIG. 2 showing a center door seal.

Each door comprises upper and lower door panels 91, 93 with each door panel having relatively narrow top and bottom flanges 95 and 97 running along respective top and bottom edges of the door panel and projecting generally horizontally from the door panel on the rear face 89 of the door. The door panels 91, 93 are disposed one above the other in generally coplanar relation with the top flange 95 of the lower door panel 93 abutting the bottom flange 97 of the upper door panel 91 in face-to-face relation. As shown in FIG. 3, a channel 96 is secured over the abutting flanges 95 and 97 to reinforce the joint between the panels 91 and 93. An elongate upper reinforcing member 99 cooperates with and is secured in horizontal position to the top flange 95 of the upper door panel 91 to form the reinforcing structure 87 along the top of the door. An elongate lower reinforcing member 101 cooperates with and is secured in horizontal position to the bottom flange 97 of the lower door panel 93 to form the reinforcing structure 87 along the bottom of the door. Each mine door further includes a pair of elongate caps generally indicated at 103, extending vertically at opposite side edges of each mine door. As best shown in FIGS. 5 and 8, each cap 103 has a generally U-shaped cross-section with a generally vertical web 105 extending in a plane generally at right angles to the plane of the mine door, a first flange 107 secured flat against the front face 109 of the mine door, and a second flange 111 secured to ends of the upper and lower flanges 95, 97 of the upper and lower door panels 91, 93. Generally Z-shaped vertical reinforcing members 113 cooperate with the caps 103 to form the box-like reinforcing structures 87 along the side edges of the doors.

Preferably, the reinforcing structure 87 and its components are fabricated from sheet metal. Constructing the mine doors 27 and 39 of sheet metal in the manner described above provides strong lightweight doors which are resistant to flexure. However, it is to be understood that other materials, such as fiberglass or the like, may be used without departing from the scope of this invention.

Figure 9:
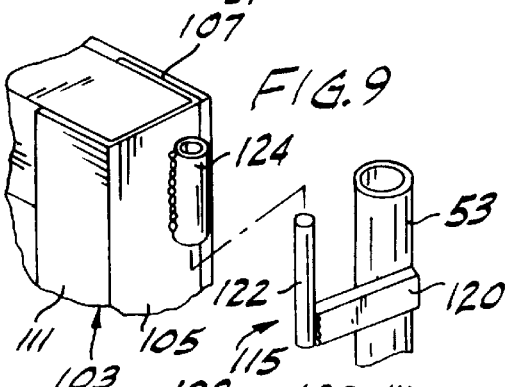
FIG. 9 is an exploded perspective of the upper door hinge.

Referring to FIGS. 4 and 5, each mine door 27, 29 has upper and lower hinge connections 115 and 117, respectively for coupling the door to its respective column 43. Preferably, the doors open and close on the same side of the door frame 23. The upper hinge connection 115 (FIG. 4) includes a short arm 120 projecting forwardly from the lower section 53 of the column. As best shown in FIG. 9, a hinge pin 122 Projects upwardly from the forward end of the arm 120 into a sleeve 124 secured to the cap 103 adjacent flange 111 on the rear face of the door. The lower hinge connection 117 (shown in FIG. 5) includes a longer arm 126 projecting forwardly from the column 43, a hinge 127 projects upwardly from the forward end of the arm 126 through a sleeve 128 secured to the cap 103, adjacent flange 107 on the front face of the door. In this arrangement, the lower hinge connection 117 is offset forwardly with respect to the upper hinge connection 115 so that the doors pivot on hinge pins 122 and 127 about an axis which is offset from vertical (being angled downwardly and forwardly from the upper hinge pin 122 to the lower hinge pin 127), thereby biasing the door toward its closed position until opened a predetermined amount. Upon opening the door beyond this predetermined amount, the offset hinge connections bias the door to swing further open. Also, it will be understood that both hinge connections 115 and 117 are connected to the lower tubular section 53 of each column 43 so that the distance between the hinge connections does not change upon convergence of the ceiling and the floor of the passageway and the relative telescoping of intermediate section 51 into lower section 53.

The mounting of the doors on hinge pins on arms 120 and 126 that project forwardly with respect to the columns 43 helps to prevent damage to doors that might occur if the doors were hingedly mounted between the columns 43. Shifting or heaving of the mine typically causes the center of the passageway floor to raise more than the sides, forming a bulge in the center of the passageway. This bulge causes the lower ends of the columns to move closer together. If the doors were mounted between the columns, movement of the lower ends of the columns toward each other would cause the doors to move together, compressing them against each other and also urging the tops of the doors against the lintel 45. This movement of the doors would soon impair their operation and eventually cause them to buckle. The mounting of the doors outside of the door frame defined in the columns and the lintel 45, allows substantial movement of the columns 43 before the operation of the doors is impaired or the doors are damaged.

Each mine door 27 and 29 has a peripheral sealing gasket 118 (as shown in FIGS. 4 and 5) extending vertically along the rear flange 111 of the cap 103 adjacent the hinged edge of the door to seal against a respective column 43 when the door is closed. A sealing gasket 119 (shown in FIG. 3) extends horizontally along each upper reinforcing member 99 to seal against the lintel member 45 when the doors are closed.

Figure 10:
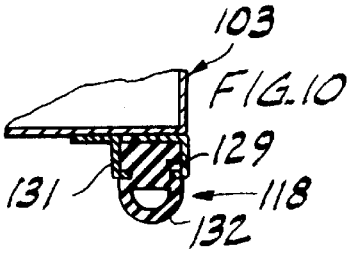
FIG. 10 is an enlarged section of a peripheral door seal.

FIG. 10 is an enlarged cross sectional view of the sealing gaskets 118, 119. The gaskets are generally A-shaped in cross-section, having an inner base part 129 received in a supporting channel 131 secured to the door, and an outer hollow portion 132. Preferably, the sealing gaskets 118 and 119 are made of a flexible material such as rubber or the like. Although the sealing gaskets 118 and 119 are shown in the preferred embodiment mounted on the door, it is to be understood that the sealing gaskets 118 and 119 could be mounted on the columns 43 and the lintel 45, respectively, to seal against the door without departing from this invention. A *thin,* vertically extending sealing flap 121 (as shown in FIG. 8) is secured to and extends *freely* from the free side edge of mine door 27 *in cantilever fashion* to substantially seal against the door 29 when the doors are in their closed position. The sealing flap 121 allows for 5 a relatively large gap to be built in between the doors. This gap allows for substantial movement of the doors toward each other (as during shifting or heaving of the mine) before the operation of the doors is impaired or the doors become damaged. Additionally, a lower sealing flap 123 extends downwardly from the bottom edge of each door to substantially seal any gap between the door and the floor of the passageway. The sealing flap 123 allows for a relatively large gap to be built in between the bottoms of the doors and the floor of the passageway. This gap allows for substantial movement of the doors and buckling and bulging of the floor before the operation of the doors is impaired or the doors become damaged. Preferably, the sealing flaps 121 and 123 are formed of a flexible sheet material such as rubber or the like. The sealing members provide a substantially air tight seal so that the doors act as an airstop and a fire barrier within the passageway when closed.

OPERATION

In operation, the mine door system 21 retains its structural integrity upon a convergence of the ceiling 26 and floor 24. Upon such a convergence, the intermediate tubular sections 51 of the columns 43 telescope into the lower tubular sections 53 while the relative distance between the lintel member 45 and the floor 24 remains constant. Additionally, upon such a convergence, the upper panels 31 contract and the elongate panels 33 contract without impinging on the doors 27 and 29. Thus, in operation, the size and shape of the door frame remains generally constant, as does the distance between the hinges 113 and 117 so that the operation of the doors is not impaired.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A mine door system for installation in a passageway in a mine having a floor and ceiling, comprising a door frame adapted to be installed in the [[Passageway]] passageway to define a doorway, said door frame comprising a pair of vertical columns at opposite sides of the doorway extending from the floor to the ceiling of the passageway, and a generally horizontal lintel member supported by the columns above the doorway and spaced below the ceiling of the passageway to define a space between the ceiling and the lintel member, mine door means, means for mounting said mine door means on said door frame for movement between open and closed positions, a top panel structure for substantially closing the space between the [[doorway]] lintel member and the ceiling of the passageway, said top panel structure [[being readily contractible]] comprising a plurality of interconnected panels located in said space for closing the space between the lintel member and said ceiling, said interconnected panels being movable relative to one another to permit the panel structure to contract in said space heightwise of the passageway without loss of its structural integrity to accommodate a convergence of the ceiling and floor of the passageway without any substantial heightwise deformation of said door frame.

2. A mine door system as set forth in claim 1 wherein said interconnected panels of said top panel structure [[comprises]] comprise a plurality of extensible and contractible panels adapted to extend vertically in side-by-side relation from the top of the door frame to the ceiling of the passageway, each panel comprising upper and lower panel members having a sliding telescoping interfit, and means for securing said upper and lower panel members in fixed relation while permitting relative telescopic movement therebetween in the event of the convergence of the passageway.

3. A mine door system as set forth in claim 2 wherein [[said door frame comprises a pair of vertical columns at opposite sides of the doorway, and a lintel member spanning said columns above the doorway,]] said lintel member [[being]] is formed for receiving and holding lower ends of said [[extensible and contractible panels]] lower panel members.

4. A mine door system as set forth in claim 3 wherein said lintel member is generally channel-shaped in cross section with a generally horizontal web and vertical flanges extending up at opposite sides of the web, said web and flanges forming a channel running substantially the full length of the lintel member for receiving therein the lower ends of said extensible and contractible panels.

5. A mine door system as set forth in claim 3 wherein said mine door means comprises a pair of doors hinged on said columns for swinging open and closed on the same side of the door frame.

6. A mine door system as set forth in claim 5 further comprising vertical sealing members on said doors for sealing against said columns when said doors are closed, horizontal sealing members on said doors for sealing against said lintel member when said doors are closed, and a vertical sealing member on one of said doors for sealing against the other door when said doors are closed to cover any vertical gap between said doors.

7. A mine door system as set forth in claim 5 wherein each door has upper and lower hinge connections with a respective column, the lower hinge connection being offset laterally outwardly with respect to upper hinge connection whereby said door is biased toward its closed position until opened a predetermined amount, upon which the door is biased to swing further open.

8. A mine door system as set forth in claim 3 wherein each column has a foot end engageable with the floor of the passageway and a head end engageable with the ceiling of the passageway, tubular sections having a telescoping sliding interfit enabling adjustment of the length of the column to fit passageways of varying height, and friction lock means for locking the tubular sections in adjusted position with respect to one another, said friction lock means being adapted to permit telescoping of the upper and lower tubular sections relative to one another in the event of a convergence of the floor and ceiling of the passageway.

9. A mine door system as set forth in claim 8 wherein said tubular sections of the columns are formed to telescope without affecting the height of said lintel member.

10. A mine door system as set forth in claim 9 wherein each column comprises an upper tubular section, a lower tubular section, and an intermediate tubular section rigidly mounted atop said lower tubular section and coaxial therewith, said upper tubular section being telescopically received in said intermediate section, said member being attached at its ends to said lower sections of the columns.

11. A mine door system as set forth in claim 1 further comprising cross bars extending between said columns and respective sides of the passageway and side panel structures secured to said cross bars on opposite sides of the door frame for substantially closing spaces between the door frame and the sides of the passageway.

[[12. A mine door system as set forth in claim 11 wherein each side panel structure is contractible heightwise of the passageway without loss of its structural integrity to accommodate a convergence of the ceiling and floor of the passageway.]]

13. A mine door system as set forth in claim [[12]] 11 wherein each side panel structure comprises a plurality of extensible and contractible panels adapted to extend vertically in side-by-side relation from the floor to the ceiling of the passageway, each panel comprising upper and lower panel members having a sliding telescoping interfit, and means for securing said upper and lower panel members in fixed relation while permitting relative telescopic movement therebetween in the event of said convergence.

14. A mine door system as set forth in claim 1 wherein said door frame, said mine door means, and said top panel structure are fabricated of metal.

15. A mine door system as set forth in claim 14 wherein said mine door means and said top panel structure are fabricated of sheet metal.

16. A mine door system as set forth in claim 1 wherein said mine door means comprises a pair of doors hinged on said columns for swinging open and closed.

17. A mine door system as set forth in claim 16 wherein each door is generally rectangular in shape and fabricated of sheet metal and has a substantially continuous reinforcing structure of substantially rectangular cross section around the perimeter of the door on a first face of the door.

18. A mine door system as set forth in claim 17 wherein each door comprises upper and lower door panels, each door panel having relatively narrow upper and lower flanges running along respective top and bottom edges of the door panel and projecting generally horizontally from the door panel on said first face of the door, said door panels being disposed one above the other in generally coplanar relation with the upper flange of the lower door panel in face-to-face relation with the lower flange of the upper door panel, an elongate upper reinforcing member cooperative with said upper flange of said upper door panel to form said reinforcing structure along the top of the door, and a lower reinforcing member cooperative with said lower flange of the lower door panel to form said reinforcing structure along the bottom of the door.

19. A mine door system as set forth in claim 18 further comprising a pair of elongate caps along opposite sides of the door, each cap being of generally U-shape in cross section to have a generally vertical web extending in a plane generally at right angles to the plane of the door, a first flange secured flat against a second face of the door opposite said first face, and a second flange secured to ends of the upper and lower flanges of the upper and lower door panels, and generally vertical reinforcing members extending between the upper and lower flanges of each door panel adjacent opposite sides of the door in positions generally parallel to and spaced relatively closely to the webs of said caps to form said reinforcing structure along the sides of the door.

20. A mine door adapted for hinged mounting in a doorway formed by a door frame installed in the passageway in a mine, the mine door being generally rectangular in shape and fabricated of sheet metal and having a substantially continuous reinforcing structure of substantially rectangular cross section around the perimeter of the door on a first face of the door, the door comprising upper and lower door panels, each door panel having relatively narrow upper and lower flanges running along respective top and bottom edges of the door panel and projecting generally horizontally from the door panel on said first face of the door, said door panels being disposed one above the other in generally coplanar relation with the upper flange of the lower door panel in face-to-face relation with the lower flange of the upper door panel, an elongate upper reinforcing member cooperative with said upper flange of said upper door panel to form said reinforcing structure along the top of the door, and a lower reinforcing member cooperative with said lower flange of the lower door panel to form said reinforcing structure along the bottom of the door.

21. The mine door according to claim 20 further comprising a pair of elongate caps along opposite sides of the door, each cap being of generally U-shape in cross section to have a generally vertical web extending in a plane generally at right angles to the plane of the door, a first flange secured flat against a second face of the door opposite said first face, and a second flange secured to ends of the upper and lower flanges of the upper and lower door panels, and generally vertical reinforcing members extending between the upper and lower flanges of each door panel adjacent opposite sides of the door in positions generally parallel to and spaced relatively closely to the webs of said caps to form said reinforcing structure along the sides of the door.

*22. A mine door system for installation in a passageway in a mine, comprising a door frame adapted to be installed in the passageway to define a doorway, said door frame comprising at least one column at one side of the doorway and a generally horizontal lintel member supported by the column and extending across the top of the doorway, and mine door means* [[*mounted*]] hinged *on said column for* [[*movement*]] swinging relative to the column *between open and closed positions,* said lintel member having a sleeve on at least one end thereof, said column passing vertically through said sleeve and being rotatable relative to the sleeve, *said column comprising a plurality of* telescoping *column sections adapted to yield heightwise relative to one another to accommodate a convergence of the ceiling and the floor of the passageway without any substantial change in the elevation of the lintel member and height of the doorway.*

*23. A mine door system* [[*as set forth in claim* 22]] for installation in a passageway in a mine, comprising a door frame adapted to be installed in the passageway to define a doorway, said door frame comprising at least one column at one side of the doorway and a generally horizontal lintel member supported by the column and extending across the top of the doorway, and mine door means mounted on said column for movement relative to the column between open and closed positions, said lintel member having a sleeve on at least one end thereof, said column passing vertically through said sleeve, said column comprising a plurality of telescoping column sections adapted to yield heightwise relative to one another to accommodate a convergence of the ceiling and the floor of the passageway without any substantial change in the elevation of the lintel member and height of the doorway, *wherein said column comprises a lower section engageable with the floor of the passageway and an upper section engageable with the ceiling of the passageway and having a sliding interfit with the lower member, friction lock means for locking the upper section in fixed position relative to the lower section, and means mounting said lintel member and door means on said lower section of the column, said friction lock means being adapted to permit sliding of the upper section relative to the lower section in the event of a convergence of the floor and ceiling of the passageway whereby the heightwise position of the lintel member and door means remains substantially unchanged.*

*24. A mine door system as set forth in claim 23 wherein said upper and lower column sections are tubular sections, each column also including an intermediate tubular section coaxial with said upper and lower tubular sections, said upper tubular section being telescopically received in said intermediate section.*

*25. A mine door* [[*adapted for mounting*]] mounted *in a doorway formed by a door frame installed in a passageway in a mine, the mine door being generally rectangular in shape and fabricated of sheet metal and having a reinforcing structure* attached to the door and *extending substantially continuously around the perimeter of the door on a first face of the door, said reinforcing structure having a box-like cross sectional shape with a hollow interior and comprising relatively narrow upper and lower flanges running along the door generally adjacent the top and bottom edges of the door and projecting outwardly from said first face of the door, an elongate upper reinforcing member cooperative with said upper flange to define the interior of said hollow, box-like reinforcing structure generally adjacent the top of the door, and an elongate lower reinforcing member cooperative with said lower flange to define the interior of said hollow, box-like reinforcing structure generally adjacent the bottom of the door.*

*26. A mine door* [[*as set forth in claim 25 further comprising*]] adapted for mounting in a doorway formed by a door frame installed in a passageway in a mine, the mine door being generally rectangular in shape and fabricated of sheet metal and having a reinforcing structure extending substantially continuously around the perimeter of the door on a first face of the door, said reinforcing structure having a box-like cross sectional shape with a hollow interior and comprising relatively narrow upper and lower flanges running along the door generally adjacent the top and bottom edges of the door and projecting outwardly from said first face of the door, an elongate upper reinforcing member cooperative with said upper flange to define the interior of said hollow, box-like reinforcing structure generally adjacent the top of the door, and an elongate lower reinforcing member cooperative with said lower flange to define the interior of said hollow, box-like reinforcing structure generally adjacent the bottom of the door, *a pair of elongate caps along opposite sides of the door, each cap being of generally U-shape in cross section to have a generally vertical web extending in a plane generally at right angles to the plane of the door, a first flange secured flat against the second face of the door opposite said first face, and a second flange secured to ends of said upper and lower door flanges, and generally vertical reinforcing members extending between the upper and lower door flanges adjacent opposite sides of the door in positions generally parallel to and spaced relatively closely to the webs of the caps to form said reinforcing structure along the sides of the door.*

*27. A mine door* [[*adapted for mounting*]] mounted *in a doorway formed by a door frame installed in a passageway in a mine, the mine door being fabricated from sheet metal and being generally rectangular in shape with opposing relatively wide faces generally parallel to the plane of the doorway when the door is closed, said mine door having a reinforcing structure* attached to the door and *extending substantially continuously around the door on one of said relatively wide faces of the door generally adjacent the outer perimeter of the door, said reinforcing structure having a*

*box-like cross sectional shape with a hollow interior and projecting laterally from said one relatively wide face of the door so that the hollow interior of the box-like structure is at one side of said one relatively wide face of the door.*

*28. A mine door system for installation in a passageway in a mine, comprising a door frame adapted to be installed in the passageway to define a doorway, said door frame comprising a pair of supports at opposite sides of the doorway and a generally horizontal lintel member supported by said pair of supports and extending across the top of the doorway, and mine door means mounted on the door frame for movement between* [[*open*]] an open position *and* a *closed* [[*positions*]] position in which said mine door means engages said lintel member, *at least one of said supports comprising a column having a plurality of column sections extensible and contractible heightwise relative to one another to enable adjustment of the length of the column to fit passageways of varying height,* said lintel member having a box-beam construction, a vertical height, and a depth in a horizontal direction generally perpendicular to the doorway greater than said vertical height whereby the lintel member resists horizontal deflection due to force extended by said mine door means in its said closed position.

29. A mine door mounted in a doorway formed by a door frame installed in a passageway in a mine, the mine door being fabricated from sheet metal and being generally rectangular in shape with opposing relatively wide faces generally parallel to the plane of the doorway when the door is closed, said mine door having a reinforcing structure attached to the door and extending substantially continuously around the door on one of said relatively wide faces of the door generally adjacent the outer perimeter of the door, said reinforcing structure having a box-like cross sectional shape with a hollow interior and projecting laterally from said one relatively wide face of the door so that the hollow interior of the reinforcing structure is at one side of said one relatively wide face of the door, said reinforcing structure comprising, at least in part, sheet metal flanges extending laterally from said one face of the door and running along a portion of the periphery of the door, and sheet metal reinforcing members cooperative with said flanges to form the box-like cross sectional shape of said reinforcing structure.

30. A mine door as set forth in claim 29 wherein said door has edge margins bent to form said sheet metal flanges.

31. A mine door as set forth in claim 30 wherein said flanges include one flange having an outer edge margin bent to form a lip extending over and spaced from said one face of the door, said one flange forming a first side of said box-like cross sectional shape and said lip forming at least part of a second side of said cross sectional shape, said reinforcing members including one reinforcing member having a first planar portion in face-to-face contact with the lip of said one flange to form at least part of said second side of said cross sectional shape and a second planar portion extending at an angle from the first planar portion to said door panel to form a third side of said cross sectional shape.

32. A mine door as set forth in claim 31 wherein said one face of the door forms a fourth side of said cross sectional shape.

33. A mine door as set forth in claim 27 wherein said reinforcing structure is of polygonal outline in transverse cross-section having sheet metal sides defining said box-like cross-sectional shape, said sides being joined together forming a complete box-like cross-sectional shape for strength, and said reinforcing structure, at least in part, including as one of said sides a marginal portion of the sheet metal of the door which has said relatively wide faces.

34. A mine door as set forth in claim 33 wherein said marginal portion comprises a coplanar portion of the sheet metal of the door.

35. A mine door as set forth in claim 34 wherein said marginal portion further comprises a flange portion of the sheet metal of the door bent to extend generally at right angles with respect to the plane of the door from an edge of said coplanar portion.

36. A mine door as set forth in claim 35 wherein said flange portion has an outer edge portion bent to extend generally parallel to and spaced from said one face of the door to form at least part of one side of said reinforcing structure.

37. A mine door as set forth in claim 36 further comprising a sheet metal member other than said marginal portion forming at least one side of the reinforcing structure.

38. A mine door as set forth in claim 27 wherein said reinforcing structure comprises multiple box-like sections extending along said one relatively wide face of the door and joined at corners of the door to form a continuous box-like structure at said corners of the door.

39. A mine door as set forth in claim 27 wherein said mine door has hinges mounting said door on said door frame installed in said mine passageway.

* * * * *